United States Patent Office 3,524,853
Patented Aug. 18, 1970

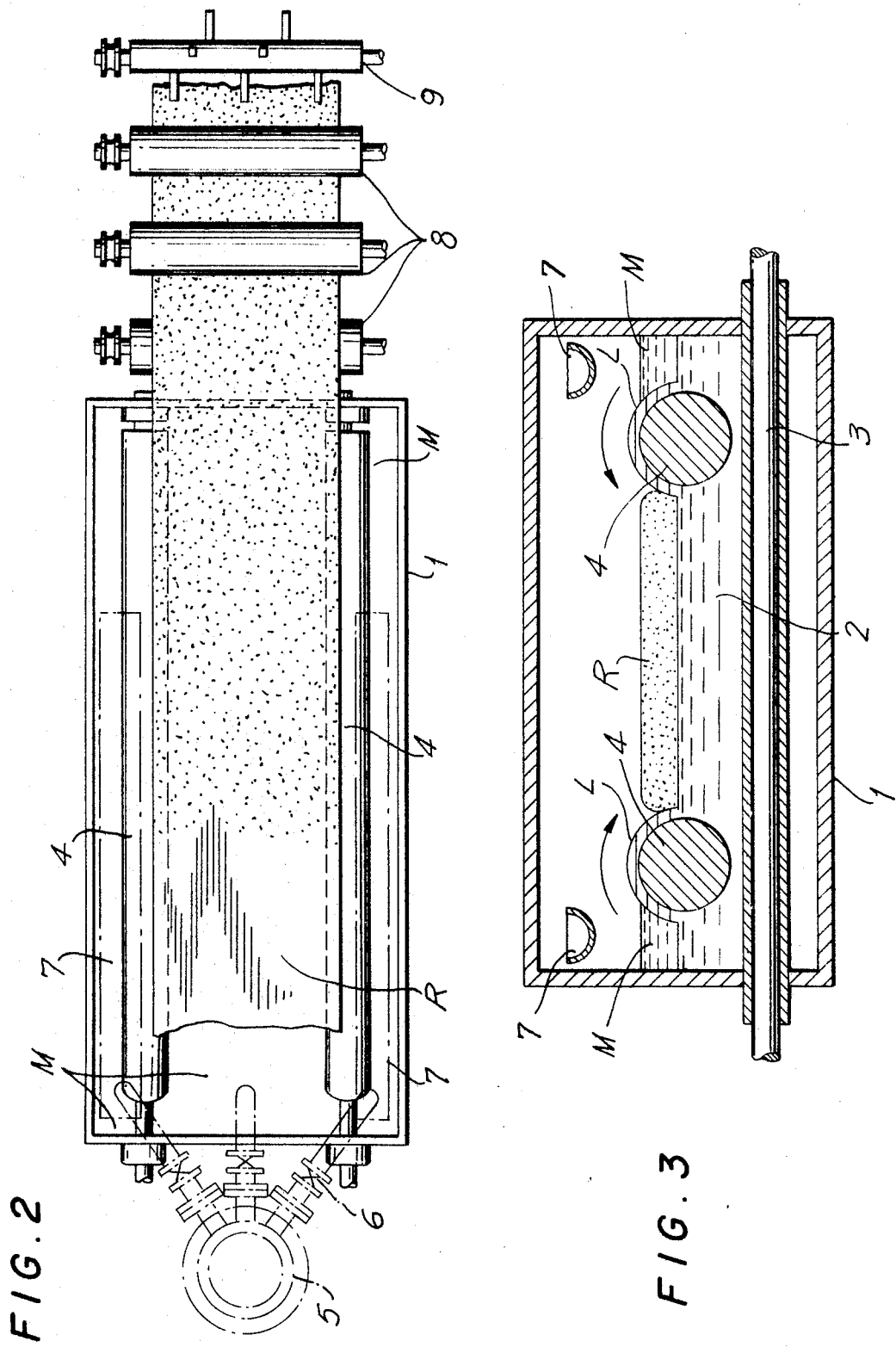

3,524,853
PROCESS OF PRODUCING CYANURIC ACID
Yoshitaka Saito, Tadotsu-machi, and Satoru Takeuchi and Takuo Mashige, Marugame-shi, Japan, assignors to Shikoku Kasei Kogyo Company, Limited, Kagawaken, Japan
Filed Feb. 1, 1968, Ser. No. 702,362
Int. Cl. C07d 55/36
U.S. Cl. 260—248
8 Claims

ABSTRACT OF THE DISCLOSURE

In a process of producing cyanuric acid by thermally cracking urea and/or biuret on the surface of a molten metal, the reaction zone where the thermal cracking is effected is partitioned by cylindrical rollers horizontally arranged along the upper surface of and partly dipped into the molten metal, whereby the commercial working of the process is facilitated. Particularly the walls of the reaction vessel are prevented from adhesion of the product.

BACKGROUND OF THE INVENTION

Field of the invention

This invention belongs to the field of art for the production of heterocyclic compounds, and particularly of triazine derivatives.

Description of the prior art

It is well known that cyanuric acid is obtained by heating urea or biuret or a mixture thereof up to a temperature higher than the melting points thereof, the reaction being in accordance with the equations:

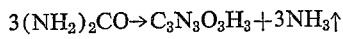

or

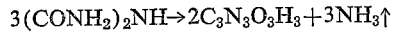

However, it is known that various secondary reactions occur in addition to those represented by the above equations. Particularly, in a case where the heating temperature is uneven, many secondary reactions occur which result in a low yield of cyanuric acid. Further, during the conversion of urea or biuret to cyanuric acid by heat treatment, the physical state of the reactant changes successively from liquid to solid through a white turbid viscous state. Namely, when urea or biuret is heated, at first a clear liquid is obtained having a relatively low viscosity at the melting point thereof. Then by heating further up to a temperature of from 150° C. to 180° C., evolution of gaseous $NH_3$ occurs while the liquid becomes more viscous. At a temperature of 200° C. to 220° C. gaseous $NH_3$ is evolved energetically, resulting in an extremely viscous white semi-solid which is finally solidified. When the solid is heated further up to a temperature of from 250° C. to 300° C., the major portion of the reactant is converted to cyanuric acid. By still heating continuously, when temperature of the reactant becomes 300° C. or higher, the produced cyanuric acid decomposes gradually into gaseous cyanic acid resulting in emission thereof. By virtue of the change in the state of the reactant being heated as above, during the operation in accordance with the prior art method of producing cyanuric acid by heat treatment of urea or biuret or a mixture thereof in a conventional heating equipment, the product adheres to the wall of the equipment, impellers and the like so that the operation becomes remarkably difficult and, in addition, it becomes difficult to heat same so as to bring about an even temperature. Thus the yield of cyanuric acid is lowered. Moreover, it is very laborious to remove the adhered product from the reaction equipment.

The process for the production disclosed in cyanuric acid of U.S. Pat. No. 3,275,631 has solved the major part of the above problem, but further problems for practically working the process have remained unsolved. At first, although the reactants do not adhere to the molten metal which is the heating medium for the reaction, the reactants adhere to the walls of the reaction vessel and are solidified thereon when the reactants are heated so as to change the physical properties. By virtue of this adhesion of the solidified reactants to the walls, continuous removal of the product from the reaction vessel may be impeded. In order to avoid the difficulty, it is necessary to curtail the feed of starting material so as to treat the material only in the central portion of the upper surface of the molten metal in the reaction vessel, ending in a disadvantageously lowered productive capacity. Particularly in a commercially productive system, it is desirable to continuously remove the product from the reaction vessel in the form of plates. In such a case the difficulty is more serious.

Secondly, if the surface of the molten metal is stirred during the removal of the product from the reaction vessel, the molten metal may partly be mixed with the product, resulting in complication of the after treatment.

SUMMARY OF THE INVENTION

Briefly stated, in accordance with one aspect of this invention, there is provided a step, in the process for the production of cyanuric acid comprising subjecting a starting material selected from the group consisting of urea, biuret, and mixtures of the two to a heat treatment on the surface of molten metal having a melting point not exceeding 350° C. and maintained at a temperature not exceeding 400° C., thereby thermally cracking the starting material in a reaction zone partitioned by rotary cylindrical rollers horizontally arranged along the upper surface of and partly dipped in the molten metal. It is preferred that the axis of the roller be arranged in the upper surface of the molten metal. When the roller is rotated, it is wetted by the molten metal so that a thin liquid film of molten metal is formed on the outer surface of the roller. Thus it is deemed that there is a rib of the molten metal which separates the reaction zone from a marginal zone on the surface of the molten metal. By virtue of the fluid rib of molten metal. the product in the form of a plate is always kept in a floating state within the reaction zone on the surface of the molten metal but without adhering to any solid, including the walls of the reaction vessel.

One object of this invention is to provide a step, in the process for the production of cyanuric acid in accordance with the disclosure in U.S. Pat. No. 3,275,631, whereby it is possible to remove the product, in the form of the floating plate, from the reaction vessel extremely smoothly.

Another object of this invention is to provide a step, in said process, whereby it is possible to remove the product from the reaction vessel without stirring the molten metal, thereby minimizing the quantity of molten metal accompanying the product out of the reaction vessel.

Still another object of this invention is to provide a step, in said process, whereby it is possible to easily seal the reaction area so as to recover by produced ammonia and sublimed urea or biuret and to prevent the heating medium from deteriorating by oxidation.

Still another object of this invention is to provide a step, in said process, whereby it is possible to utilize the upper surface of the heating medium in the most effective manner and to prevent the same from oxidation and mixing of the heating medium with any undesirable substance, and, in turn, to prevent resulting deterioration of the product.

In accordance with this invention, any metal may be useful in the process so long as it is relatively inert to urea and the heat treatment products thereof and as long as it remains in the liquid state in the temperature range which is pertinent for the conversion of urea into cyanuric acid. There are many metals meeting these conditions. However, the preferred metals include simple substances of such elements as tin, bismuth, lead, and the like, and alloys, for instance, those consisting of tin, antimony and lead, of bismuth, cadmium, lead, and tin, of lead and the like.

In accordance with this invention, it is preferred to rotate the roller at a peripheral speed not exceeding five meters per minute. If the roller is rotated faster, it is impossible to form a uniform film on the surface of the roller and in addition the surface of the molten metal in the reaction zone is vibrated so as to be stirred.

In accordance with this invention, it is possible to provide a rotary cylindrical roller having at least one screw thread acting as a screw conveyor. By virtue of this provision, the product in the form of plates is automatically displaced in a direction parallel to the axis of the cylinder as it floats on the surface of the molten metal.

In accordance with this invention, within a period of from 2 to 10 minutes, the charged material is solidified into a plate through the changes in physical state set forth hereinbefore. By continuing the heat treatment of the reactants for a period of from 2 to 30 minutes after the solidification, the composition of the reactants becomes about 70 percent of cyanuric acid, 25 percent of ammeline and ammelide and 5 percent of biuret. The resultant composition is removed from the metal bath, ground, and then subjected to hydrolysis by heating in an aqueous solution of a mineral acid having a concentration of from 5 to 30 perecent, thereby yielding cyanuric acid having a purity above 99 percent.

The above description refers to a case in which the heat treatment operation is carried into effect entirely on the surface of a molten metal until the major portion of the urea and/or biuret is converted into cyanuric acid, ammeline, and ammelide. It is economically preferable, however, from the commercial point of view, that the output in proportion to the quantity of metal used be increased by supplying as much starting material as possible per unit area of the surface of the molten metal. In addition, it is possible by carrying out the above process in the above manner to reduce the quantity of molten metal accompanied by and into the product. In such a case the solid plate formed on the molten metal becomes thicker so that the heat transfer towards the upper part of the solid plate opposite the molten metal becomes insufficient, resulting in lowering the rate of thermo-cracking. Although as a countermeasure to the above it may be possible to take such a measure as will increase the rate of thermo-cracking in the upper part by means of applying heat radiated downwards to the upper part, the following procedure is preferred. That is, during the period when the charged urea or biuret is changed from liquid to solid through a viscous state, the heat treatment is carried into effect only on the surface of the molten metal and, when the reactants have been solidified, the resultant solid is separated from the metal bath and ground into powder or granules having free fluidity. The powder or granules thus fluidized is then heated to a temperature of 230° C. to 300° C. for 10 to 60 minutes in a jacketed stirring heating tank so as to complete the reaction. The composition of the intermediate product just solidified on the molten metal is about 61 percent cyanuric acid, 12 percent ammeline and ammelide, and 27 percent biuret. The intermediate product neither melts nor softens by further heating so that a phenomenon such as adhesion of the intermediate product onto the wall of the tank or the stirrer does not occur even if a conventional heating tank for powder is used for heating the powder or granules fluidized as above. The powdery or granular substance thus subjected to the heat treatment again as above contains 70 to 85 percent cyanuric acid and 15 to 30 percent ammeline and ammelide. The substance may be purified into cyanuric acid having a purity above 99 percent by hydrolyzing as mentioned hereinbefore.

BRIEF DESCRIPTION OF THE DRAWING

The invention will be better understood and other objects and additional advantages of the invention will become apparent upon perusal of the following description taken in connection with the drawings, in which:

FIG. 2 is a plan view thereof; and

FIG. 3 is an enlarged cross-sectional view taken along the line A—A of FIG. 1.

DESCRIPTION OF THE PREFERRED EMBODIMENTS

Figure 1:
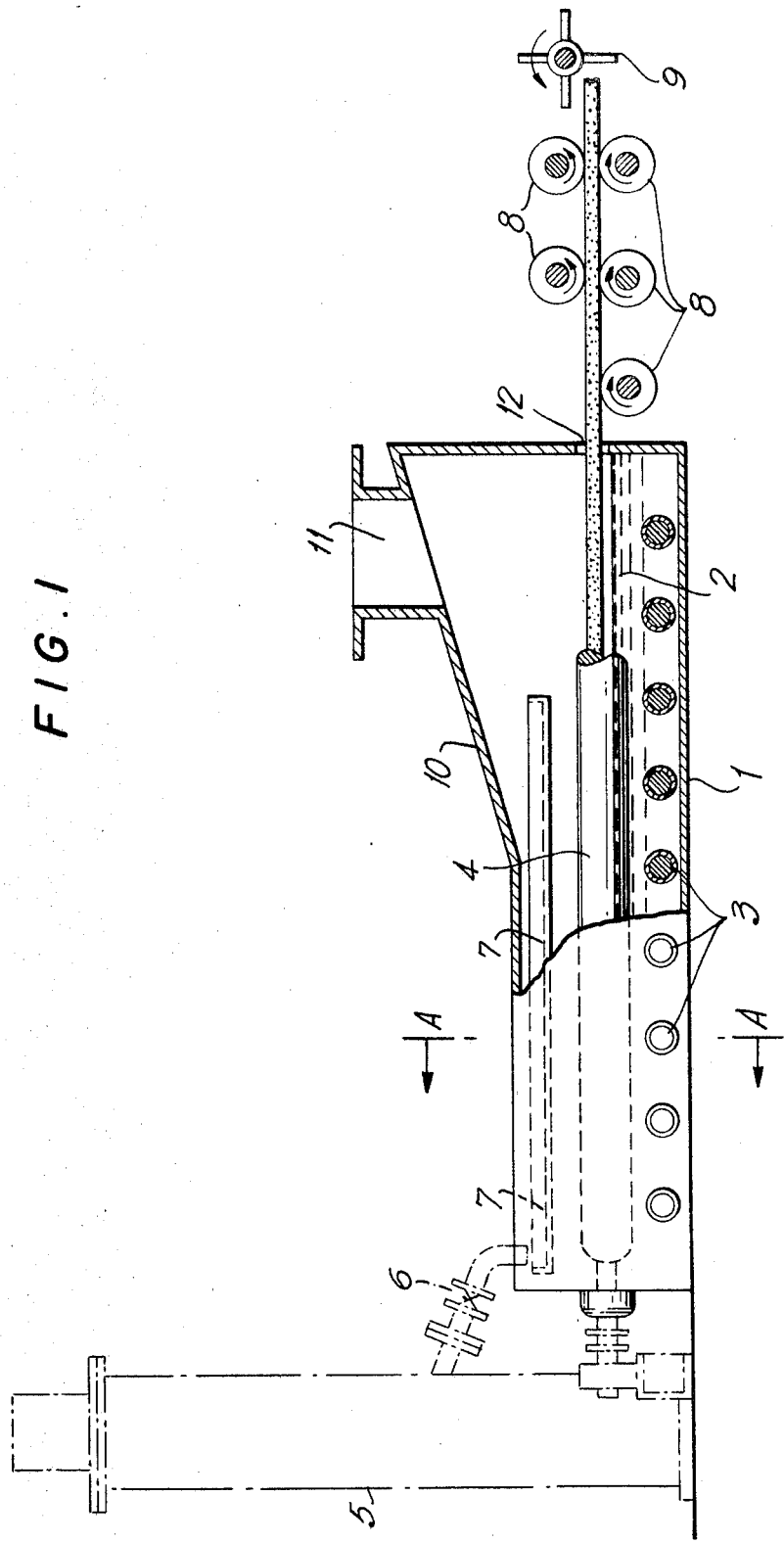
FIG. 1 is an elevational view of a cyanuric acid producing plant for carrying the process in accoradnce with this invention into effect.

The following examples illustrate methods of carrying the invention into effect; however, this description will be understood to be illustrative of the invention and not as limiting it to the particular methods described.

Example 1

A rectangular reaction vessel 1 of 1 m.$^2$ in bottom area and 10 cm. in depth was supplied with a layer of molten tin 2 of 5 cm. in thickness which was heated to a temperature of 280° C. by an electric heating means 3 applied to the bottom. The electric heating means 3 is connected with a temperature adjusting means immersed in the molten tin 2 by which the electric heating means 3 is de-energized automatically when the temperature of the molten tin 2 exceeds 280° C. By virtue of this adjustment, the temperature of the molten tin 2 is maintained within a range of from 270° C. to 280° C. throughout this example.

Two cylindrical rollers 4 of carbon steel, of which the diameter is 8 cm., are arranged near and along the longitudinal walls of the rectangular reaction vessel 1 and, of which the axes are respectively levelled with the molten tin 2. These rollers 4 are adapted to be driven by an electric motor (not shown) and an intermediate gearing (not shown) so as to be rotatable in either direction at a peripheral speed of from 1 m. to 5 m. per minute. In this example, these rollers 4 were rotated in such directions that the tops of these rollers 4 approached each other at a peripheral speed of 3.5 m. per minute.

Molten urea was charged from a storage tank 5 to an end of a reaction zone between the two rollers 4 on the surface of the molten metal 2. The flow of molten urea being introduced to the reaction zone R was controlled to a rate of 25 kg. per hour by means of valves 6. Molten urea leaving the storage tank 5 was also directed to the two narrow marginal zones M between the rollers 4 and the longitudinal walls of the reaction vessel 1 through valves 6 and troughs 7, respectively. The flow of molten urea through the two latter paths was also controlled by the valves 6 to a rate of 12.5 kg. per hour. After being poured onto the surface of the molten metal in the marginal zones M, the molten urea was controlled to flow in a reverse direction to the flowing direction in the troughs 7 along the marginal zones M and be transferred into the reaction zone R turning around the longitudinal ends of the rollers 4. The molten urea leaving the storage tank 5 was kept at a temperature of 140° C.

The molten urea charged on the surface of the molten metal in the reaction zone R was uniformly distributed on the surface of the molten metal and displaced slowly towards the other longitudinal end of the reaction vessel 1 while being heated by the molten metal which was, in turn, heated by the electric heating means 3 as described hereinbefore. By virtue of this heat treatment, the charged molten urea gradually becomes viscous while evolving gaseous ammonia energetically. After three minutes, the reactant converted into a solid plate. The solid plate floating on the surface of the molten metal was still heated thereby for a further three minutes until the evolution of gaseous ammonia ceased.

A large slot 12 is formed in the lateral wall of the other end of the reaction vessel 1 just above the level of the molten metal for removing the plate-like product. A conveying roller 8 is arranged just outside the large slot, of which the top surface is parallel to and horizontally in alignment with the lower edge of the large slot 12. By virtue of this arrangement, the approaching end of the plate-like product is easily picked up into the large slot 12 and then on the conveying roller 8. Next to and parallel to with the conveying roller 8 are arranged two other pairs of conveying rollers 8. The plate-like product leaving the first conveying roller 8 is inserted between the other pair conveying rollers 8 so as to be kept horizontally while being moved away from the first conveying roller 8. The continuously protruding front end of the plate-like product is then crushed by a rotary crusher 9 of which the axis is arranged in parallel with the conveying rollers and the vanes extend radially from the conveying rollers. The plate-like product is kept within a path while being protruded towards the crusher 8 by the conveying rollers 8 so that the brittle plate-like product is crushed into powder. In this example, the qauntity of the powder yielded was 28.8 kg. per hour on the average. The composition of the powder thus yielded was 70 percent cyanuric acid, 19.7 percent ammelide and 9.3 percent biuret.

The molten urea charged into the marginal zone M on the surface of the molten metal between the roller 4 and the longitudinal wall of the reaction vessel 1 did not become viscous during its flow through the marginal zone M because the area for transferring heat from the molten metal to the molten urea is too small.

The roller 4 which is half dipped in the molten metal while being rotated is covered by a film L of the molten metal. The marginal zone M is narrow relative to the charge thereto as stated hereinbefore, so that the charge of molten urea partly overflows into the reaction zone R along with the film of the molten metal.

It was observed that the plate-like product never adheres to the rollers 4 by virtue of the formation of the film L during the continuous operation in this example which lasted 24 hours. Accordingly, it was very easy to bring the plate-like product into the large slot 12 and thence on the conveying roller 8.

The rectangular reaction vessel 1 is covered by a lid 10. A vent hole 11 is provided in and through the lid 10 so as to recover the gaseous ammonia and gaseous urea evolved from the reactant on the molten metal in the reaction zone R. The gaseous amomnia and the gaseous urea are introduced into a urea recovering means (not shown), in which the gas is bubbled through an aqueous solution 70 percent of urea kept at a temperature of 70 to 80° C. whereby the urea evolved from the reactant is recovered. Alternatively, the gas may be washed with molten urea or condensed into a solid on a condensing surface kept at a temperature of 100 to 130° C.

The powdery product is made less than 40 mesh, then boiled with 15 percent diluted sulfuric acid for four hours to hydrolyze the powdery product. The hydrolyzed product is then cooled to a temperature of 20° C., centrifuged to remove the mother liquor, washed with water, and dried, yielding purified cyanuric acid having a purity of 99.5 percent.

In this embodiment, a continuous operation was carried out for 24 hours, during which the feed of urea totalled 1.2 tons and the yield of purified cyanuric acid totalled up to 670 kg. In addition, the total quantity of urea recovered during the period was 160 kg. According, the yield of the product was 90.3 percent of the theoretical yield. Meanwhile, the quantity of molten metal consumed during this period was 0.45 kg. which corresponds to 0.067 percent of the product.

Example 2

In this example, cyanuric acid was produced from urea by means of the same reaction vessel 1. The rollers 4 were rotated at the same speed and in the same direction as in the preceding example. The heating medium 2 was kept at the same temperature as in the preceding example, but the medium 2 was an equivalent alloy of tin and antimony.

The rear end of the reaction zone R was fed with molten urea kept at a temperature of 140° C. at a constant rate of 50 kg. per hour continuously and the intermediate points of the marginal zones M, the points corresponding under the front ends of the troughs 7, were also fed with the same molten urea at a constant rate of 25 kg. per hour continuously.

The molten urea fed to the reaction zone R uniformly distributed on the surface of the molten alloy so as to have a thickness of about 15 mm. of molten urea, which was heated by the molten alloy and thereby became gradually viscous while evolving gaseous ammonia energetically. The viscous reactant became substantially solid and dried after about three minutes from the charge and was continuously moved towards the front end of zone R. The feed of molten urea in the marginal zones M was not converted into viscous matter by virtue of the small area for the transfer of heat but was transferred into the reaction zone R over the rollers 4, of which the tops were rotated towards each other at both longitudinal sides of reaction zone R. Thus the solid formed on the surface of the molten alloy in the reaction zone R was always separated from the roller but not alhered thereto so that the plate-like solid moved smoothly forward while floating on the upper surface of the molten alloy, during the continuous operation lasting 24 hours in this embodiment. The plate-like solid product was inserted into the large slot in the front wall of reaction vessel 1, picked up by and on the conveying roller 8, held by the other pair of conveying rollers 8, and crushed by crusher 9. The reactant was passed through the reaction vessel 1 or on the surface of the molten alloy for a period which was shorter by about three minutes by means of the more speedy conveying roller 8 and the pair of conveying rollers 8 than in the preceding example. The intermediate product thus obtained was further ground down to not exceeding 40 mesh and continuously sent to a secondary heater by means of a screw feeder.

For the secondary heating, a stainless steel ribbon mixer having a diameter of 0.3 m. and a length of about 2 m. and provided with a heating jacket through which a heating medium heated to a temperature of 300° C. was recirculated, was employed. The intermediate product supplied in the starting end of this secondary heater was gradually displaced towards the other end while being stirred by means of stirring blades. During this displacement, the temperature of the reactant was maintained at 280° C. The passage of the reactant through the secondary heater required about 30 minutes on the average. The product obtained from the secondary heater was composed of 82 percent cyanuric acid, 17 percent of ammelide and 1 percent biuret and weighed 66.7 kg. per hour on the average.

The whole quantity of gas generated during the heat treatment on the molten metal bath and in the secondary heater was led to a urea condensing means (not shown) arranged above reaction vessel 1. The urea condensing means is composed of a plurality of aerofin tubes through which a heating medium heated to a temperature of about 120° C. was recirculated so that the urea contained in the gas was liquefied, impinging on the aero-fins, and thus recovered onto the molten metal bath arranged below.

On arrival of the product at the other end of the secondary heater, it was fed continuously to a hydrolysis tank together with a 15 percent aqueous solution of sulfuric acid. After being hydrolyzed similarly to the preceding example, the product was centrifuged from the sulphuric acid solution, washed with water, and dried, yielding 99.5 percent cyanuric acid.

A 24-hour continuous operation was effected in this example. A total quantity of 2.4 tons of urea were charged for the period, yielding a total quantity of 1.55 tons of purified cyanuric acid. Thus the yield was 91.5 percent. Meanwhile, 0.8 kg. of molten alloy was consumed for the period. Accordingly, the rate of consumption of the molten alloy was merely 0.052 percent of the cyanuric acid obtained.

What is claimed is:

1. In the process for the production of cyanuric acid comprising subjecting a starting material selected from the group consisting of urea, biuret, and mixtures thereof to heat treatment on the surface of a molten metal having a melting point not exceeding 350° C. and maintained at a temperature not exceeding 400° C., an improvement comprising thermally cracking said starting material in a reaction zone partitioned by cylindrical rollers horizontally arranged along the upper surface of and partly dipped in said molten metal.

2. In the process for the production of cyanuric acid comprising subjecting a starting material selected from the group consisting of urea, biuret, and mixtures thereof to heat treatment on the surface of a molten metal having a melting point not exceeding 350° C. and maintained at a temperature not exceeding 400° C., an improvement comprising continuously thermally cracking said starting material in a reaction zone partitioned by rotary cylindrical rollers horizontally arranged along the upper surface of and partly dipped in said molten metal, said starting material being fed into said reaction zone on said upper surface at a continuous rate, whereby a plate-like product it continuously formed and made to float on said upper surface, and continuously removing said plate-like product from said reaction zone by means of conveying rollers.

3. In the process for the production of cyanuric acid comprising subjecting a starting material selected from the group consisting of urea, biuret, and mixtures thereof to heat treatment on the surface of a molten metal having a melting point not exceeding 350° C. and maintained at a temperature not exceeding 400° C., an improvement comprising continuously thermally cracking said starting material in a reaction zone partitioned by rotary cylindrical rollers horizontally arranged along the upper surface of and partly dipped in said molten metal, said starting material being fed into said reaction zone on said upper surface at a continuous rate, whereby a plate-like product is continuously formed and made to float on said upper surface, continuously removing said plate-like product from said reaction zone by means of conveying rollers and continuously crushing said plate-like product by means of a rotary crusher having a plurality of blades to thereby recover said plate-like product in the form of powder.

4. In the process for the production of cyanuric acid comprising subjecting a starting material selected from the group consisting of urea, biuret, and mixtures thereof to heat treatment on the surface of a molten metal having a melting point not exceeding 350° C. and maintained at a temperature not exceeding 400° C., an improvement comprising continuously thermally cracking said starting material in a reaction zone partitioned by rotary cylindrical rollers horizontally arranged along the upper surface of and partly dipped in said molten metal, said starting material being fed into said reaction zone on said upper surface at a continuous rate, whereby a plate-like product is continuously formed and made to float on said upper surface, continuously removing said plate-like product from said reaction zone by means of conveying rollers, continuously crushing said plate-like product by means of a rotary crusher having a plurality of blades to thereby recover said plate-like product in the form of powder, and heating said powdery product to obtain a fine powder having free fluidity.

5. A process as claimed in claim 1 wherein the rollers are rotated at a peripheral speed of about 1 to 5 meters per minute.

6. A process, as claimed in claim 1 wherein said reaction zone is maintained at a temperature of about 230° to 350° C.

7. A process as claimed in claim 4, further comprising hydrolyzing said fine powder in an aqueous solution of mineral acid.

8. A process as claimed in claim 1, wherein gaseous by-products including sublimated urea formed in said reaction zone are recovered by a recovering means cooperated with said reaction vessel.

References Cited

UNITED STATES PATENTS 3,275,631   9/1966   Yanagizawa   260—248

JOHN D. RANDOLPH, Primary Examiner

J. M. FORD, Assistant Examiner

U.S. Cl. X.R.

260—249.5, 249.8